(12) United States Patent
Noda

(10) Patent No.: US 7,145,736 B2
(45) Date of Patent: Dec. 5, 2006

(54) LENS ASSEMBLY FOR AN IMAGE SENSOR

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/011,287

(22) Filed: Dec. 13, 2004

(65) Prior Publication Data

US 2006/0126193 A1 Jun. 15, 2006

(51) Int. Cl.
*G02B 9/14* (2006.01)
*G02B 3/02* (2006.01)

(52) U.S. Cl. ...................... 359/785; 359/719
(58) Field of Classification Search ................ 359/784, 359/785, 642, 719
See application file for complete search history.

(56) References Cited

U.S. PATENT DOCUMENTS 5,940,219 A * 8/1999 Yamada ...................... 359/642
6,970,306 B1 * 11/2005 Matsuo ........................ 359/716

* cited by examiner

*Primary Examiner*—Loha Ben
*Assistant Examiner*—Jack Dinh
(74) *Attorney, Agent, or Firm*—Charles E. Baxley

(57) ABSTRACT

A lens assembly for an image sensor comprises an aperture, a first lens, a second lens and a third lens, which are arranged sequentially from the object side. The first lens is a plano-convex lens or a positive meniscus lens whose convex surface faces the object side; the second lens is a negative meniscus lens with a convex surface facing the image side and at least has an aspherical surface; and the third lens is a positive meniscus lens with a convex surface facing the object side and, at least, has an aspherical surface. The sensitivity of decentration and the aberration-correction effect of the whole lens assembly in accordance with the present invention can be effectively improved.

24 Claims, 31 Drawing Sheets focal length: f=4.86
fnumber: F2.88
angle of view: 2ω=57.4°

|   | r | d | nd | vd |
|---|---|---|---|---|
| 1 | 2.000 | 0.93 | 1.48749 | 70.4 |
| 2 | 39.491 | 1.04 | | |
| 3 | -0.976 | 0.60 | 1.58300 | 31.0 |
| 4 | -1.831 | 0.08 | | |
| 5 | 1.825 | 1.30 | 1.51357 | 56.8 |
| 6 | 3.837 | 0.40 | | |
| 7 | ∞ | 0.40 | 1.51680 | 64.2 |
| 8 | ∞ | | | |

$f3/f1=$ 1.296
$f/d2=$ 8.103
$R32/R31=$ 2.103
$f/|f23|=$ 0.035

-0.2　0　0.2
spherical aberration

-0.2　0　0.2
astigmatic difference

-3　0　3
distortion aberration focal length : f=4.18
fnumber : F2.78
angle of view : 2ω=62.4°

|   | r      | d    | nd      | vd   |
|---|--------|------|---------|------|
| 1 | 1.483  | 0.69 | 1.51357 | 56.8 |
| 2 | 6.868  | 1.02 |         |      |
| 3 | -0.682 | 0.49 | 1.58300 | 31.0 |
| 4 | -1.074 | 0.04 |         |      |
| 5 | 2.507  | 1.04 | 1.51357 | 56.8 |
| 6 | 6.720  | 0.60 |         |      |
| 7 | ∞      | 0.70 | 1.51680 | 64.2 |
| 8 | ∞      |      |         |      | f3/f1 = 1.982
f/d2 = 8.521
R32/R31 = 2.681
f/|f23| = 0.007 focal length : f=4.85
fnumber : F2.80
angle of view : 2ω=60.1°

|   | r | d | nd | vd |
|---|---|---|---|---|
| 1 | 1.907 | 0.83 | 1.51357 | 56.8 |
| 2 | 23.464 | 0.95 | | |
| 3 | -0.798 | 0.58 | 1.58300 | 31.0 |
| 4 | -1.354 | 0.16 | | |
| 5 | 2.562 | 1.29 | 1.51357 | 56.8 |
| 6 | 9.544 | 1.50 | | |
| 7 | ∞ | 0.30 | 1.51680 | 64.2 |
| 8 | ∞ | | | |

$f3/f1=$ 1.608
$f/d2=$ 8.388
$R32/R31=$ 3.725
$f/|f23|=$ 0.039

-0.2  0  0.2
spherical aberration

-0.2  0  0.2
astigmatic difference

-3  0  3
distortion aberration focal length : f=4.21
fnumber : F2.81
angle of view : 2ω=62.7°

|   | r | d | nd | vd |
|---|---|---|---|---|
| 1 | 1.681 | 0.71 | 1.51357 | 56.8 |
| 2 | 152.698 | 0.82 | | |
| 3 | -0.731 | 0.49 | 1.58300 | 31.0 |
| 4 | -1.693 | 0.08 | | |
| 5 | 1.551 | 1.42 | 1.51357 | 56.8 |
| 6 | 7.506 | 0.75 | | |
| 7 | ∞ | 0.70 | 1.51680 | 64.2 |
| 8 | ∞ | | | |

$f3/f1=$ 1.065
$f/d2=$ 8.602
$R32/R31=$ 4.840
$f/|f23|=$ 0.123

-0.2   0   0.2
spherical aberration

-0.2   0   0.2
astigmatic difference

-3   0   3
distortion aberration focal length : f=4.80
fnumber : F2.79
angle of view : 2ω=63.9°

| | r | d | nd | vd |
|---|---|---|---|---|
| 1 | 2.161 | 0.77 | 1.51357 | 56.8 |
| 2 | 644.666 | 1.13 | | |
| 3 | -0.865 | 0.50 | 1.58300 | 31.0 |
| 4 | -1.446 | 0.22 | | |
| 5 | 2.042 | 1.41 | 1.51357 | 56.8 |
| 6 | 4.371 | 1.04 | | |
| 7 | ∞ | 0.30 | 1.51680 | 64.2 |
| 8 | ∞ | | | |

$f3/f1 =$ 1.467
$f/d2 =$ 9.574
$R32/R31 =$ 2.141
$f/|f23| =$ 0.010

-0.2  0  0.2
spherical aberration

-0.2  0  0.2
astigmatic difference

-3  0  3
distortion aberration focal length : f=6.26
fnumber : F2.80
angle of view : 2ω=57.8°

|   | r | d | nd | vd |
|---|---|---|---|---|
| 1 | 2.450 | 1.14 | 1.48749 | 70.4 |
| 2 | 25.798 | 1.19 | | |
| 3 | -1.906 | 0.60 | 1.58300 | 31.0 |
| 4 | -3.524 | 0.84 | | |
| 5 | 2.414 | 1.70 | 1.51357 | 56.8 |
| 6 | 3.040 | 0.70 | | |
| 7 | ∞ | 0.30 | 1.51680 | 64.2 |
| 8 | ∞ | | | |

$f3/f1=$ 2.173
$f/d2=$ 10.439
$R32/R31=$ 1.260
$f/|f23|=$ 0.262

-0.2　0　0.2
spherical aberration

-0.2　0　0.2
astigmatic difference

-3　0　3
distortion aberration focal length : f=5.11
fnumber : F2.79
angle of view : 2ω=64.1°

| | r | d | nd | vd |
|---|---|---|---|---|
| 1 | 2.292 | 0.86 | 1.51370 | 64.0 |
| 2 | ∞ | 1.11 | | |
| 3 | -0.777 | 0.50 | 1.58300 | 31.0 |
| 4 | -1.311 | 0.06 | | |
| 5 | 2.531 | 1.70 | 1.51357 | 56.8 |
| 6 | 17.270 | 0.80 | | |
| 7 | ∞ | 0.30 | 1.51680 | 64.2 |
| 8 | ∞ | 0.10 | | |
| 9 | ∞ | 0.40 | 1.51680 | 64.2 |
| 10 | ∞ | | | |

$f3/f1 =$ 1.246
$f/d2 =$ 10.218
$R32/R31 =$ 6.823
$f/|f23| =$ 0.093

-0.2  0  0.2
spherical aberration

-0.2  0  0.2
astigmatic difference

-3  0  3
distortion aberration focal length : f=3.15
fnumber : F2.89
angle of view : 2ω=60.9°

|   | r | d | nd | vd |
|---|---|---|---|---|
| 1 | 1.245 | 0.63 | 1.51357 | 56.8 |
| 2 | 12.246 | 0.59 | | |
| 3 | -0.872 | 0.60 | 1.58300 | 31.0 |
| 4 | -1.550 | 0.03 | | |
| 5 | 1.687 | 0.94 | 1.51357 | 56.8 |
| 6 | 2.598 | 0.59 | | |
| 7 | ∞ | 0.30 | 1.51680 | 64.2 |
| 8 | ∞ | 0.13 | | |
| 9 | ∞ | 0.40 | 1.51680 | 64.2 |
| 10 | ∞ | | | |

$f3/f1=$ 2.616
$f/d2=$ 5.248
$R32/R31=$ 1.541
$f/|f23|=$ 0.125

-0.2　0　0.2
spherical aberration

-0.2　0　0.2
astigmatic difference

-3　0　3
distortion aberration focal length : f=2.91
fnumber : F2.90
angle of view : 2ω=64.2°

|   | r | d | nd | vd |
|---|---|---|---|---|
| 1 | 1.374 | 0.62 | 1.52996 | 55.8 |
| 2 | 100.000 | 0.59 | | |
| 3 | -0.767 | 0.50 | 1.60700 | 27.0 |
| 4 | -1.410 | 0.05 | | |
| 5 | 1.243 | 0.90 | 1.51357 | 56.8 |
| 6 | 2.069 | 0.20 | | |
| 7 | ∞ | 0.30 | 1.51680 | 64.2 |
| 8 | ∞ | 0.15 | | |
| 9 | ∞ | 0.40 | 1.51680 | 64.2 |
| 10 | ∞ | | | |

$f3/f1 =$ 1.686
$f/d2 =$ 5.818
$R32/R31 =$ 1.665
$f/|f23| =$ 0.022

-0.2　0　0.2
spherical aberration

-0.2　0　0.2
astigmatic difference

-3　0　3
distortion aberration focal length : f=4.87
fnumber : F2.78
angle of view : 2ω=66.2°

|   | r | d | nd | vd |
|---|---|---|---|---|
| 1 | 1.966 | 0.89 | 1.51357 | 56.8 |
| 2 | 98.489 | 0.91 | | |
| 3 | -1.034 | 0.53 | 1.58300 | 31.0 |
| 4 | -2.064 | 0.14 | | |
| 5 | 2.052 | 1.56 | 1.51357 | 56.8 |
| 6 | 4.265 | 0.30 | | |
| 7 | ∞ | 0.85 | 1.51680 | 64.2 |
| 8 | ∞ | | | |

$f3/f1 =$ 1.596
$f/d2 =$ 9.185
$R32/R31 =$ 2.079
$f/|f23| =$ 0.291

-0.2　0　0.2
spherical aberration

-0.2　0　0.2
astigmatic difference

-3　0　3
distortion aberration focal length : f=3.00
fnumber : F2.80
angle of view : 2ω=60.0°

|    | r      | d    | nd      | vd   |
|----|--------|------|---------|------|
| 1  | 1.111  | 0.58 | 1.52470 | 56.2 |
| 2  | 20.741 | 0.49 |         |      |
| 3  | -0.533 | 0.40 | 1.58300 | 31.0 |
| 4  | -0.954 | 0.07 |         |      |
| 5  | 1.778  | 0.76 | 1.52470 | 56.2 |
| 6  | 4.873  | 0.30 |         |      |
| 7  | ∞      | 0.40 | 1.51680 | 64.2 |
| 8  | ∞      | 0.10 |         |      |
| 9  | ∞      | 0.30 | 1.51680 | 64.2 |
| 10 | ∞      |      |         |      | f3/f1 = 2.220
f/d2 = 7.497
R32/R31 = 2.741
f/|f23| = 0.202 focal length : f=4.30
fnumber : F2.79
angle of view : 2ω=69.2°

| | r | d | nd | vd |
|---|---|---|---|---|
| 1 | 2.109 | 0.77 | 1.52470 | 56.2 |
| 2 | ∞ | 0.95 | | |
| 3 | -0.746 | 0.50 | 1.58300 | 31.0 |
| 4 | -1.386 | 0.05 | | |
| 5 | 1.833 | 1.35 | 1.52470 | 56.2 |
| 6 | 10.686 | 1.30 | | |
| 7 | ∞ | 0.50 | 1.51680 | 64.2 |
| 8 | ∞ | | | | f3／f1＝ 0.997
f／d2＝ 8.599
R32／R31＝ 5.831
f／|f23|＝ 0.199

-0.2   0   0.2
spherical aberration

-0.2   0   0.2
astigmatic difference

-3   0   3
distortion aberration (embodiment no.1)
aspherical coefficient

| | first surface | second surface | third surface | fourth surface |
|---|---|---|---|---|
| K= | −2.44010E+00 | −7.75610E−01 | −1.32850E+01 | −3.89360E+00 |
| A= | 2.89131E−02 | −1.55881E−02 | −2.08531E−03 | −5.36953E−02 |
| B= | 2.05619E−02 | 1.44974E−01 | 2.99035E−03 | 1.41230E−02 |
| C= | 8.78570E−03 | −6.72612E−02 | −6.50446E−04 | −2.87675E−03 |
| D= | −6.23341E−03 | 1.08195E−02 | 2.87455E−05 | 3.95805E−04 |
| E= | −3.79972E−02 | −5.68164E−04 | −6.76862E−08 | −3.06033E−05 |

(embodiment no.2)
aspherical coefficient

| | first surface | second surface | third surface | fourth surface |
|---|---|---|---|---|
| K= | 6.10769E−01 | 0.00000E+00 | −1.07566E+00 | −8.10407E−01 |
| A= | −3.73279E−02 | −2.53991E−04 | 2.42665E−02 | −1.84612E−02 |
| B= | 5.12107E−02 | −1.16389E−01 | −7.18741E−02 | 1.57545E−01 |
| C= | −2.07984E−01 | 1.74491E−01 | −1.19369E−01 | −7.88763E−02 |
| D= | 2.50939E−01 | −2.38223E−01 | 6.81709E−02 | 2.43516E−02 |
| E= | −1.65154E−01 | 3.65126E−02 | 6.58253E−02 | 1.23305E−03 |

| | fifth surface | sixth surface |
|---|---|---|
| K= | −3.26316E+01 | −4.14666E−01 |
| A= | 1.74240E−02 | −6.56766E−02 |
| B= | −8.32973E−03 | 2.13447E−02 |
| C= | 1.15988E−03 | −5.07118E−03 |
| D= | 2.25699E−04 | 5.57894E−04 |
| E= | −9.44467E−05 | −2.17472E−05 |
| F= | 7.67664E−07 | 1.75082E−06 |
| G= | 1.14323E−06 | −4.82083E−07 |

(embodiment no.3)
aspherical coefficient

| | first surface | second surface | third surface | fourth surface |
|---|---|---|---|---|
| K= | 6.64026E−01 | −1.79839E+03 | −1.18746E+00 | −1.19915E+00 |
| A= | −2.13480E−02 | −2.30420E−02 | 5.58020E−02 | 1.24310E−01 |
| B= | 1.39510E−02 | −3.21780E−02 | 8.22341E−03 | 8.46950E−02 |
| C= | −7.40770E−02 | 4.24940E−02 | −1.79120E−02 | −2.89970E−02 |
| D= | 8.27650E−02 | −8.23020E−02 | −4.64449E−03 | 4.89270E−03 |
| E= | −4.36960E−02 | 2.95480E−02 | −1.14270E−02 | −5.19850E−04 |

| | fifth surface | sixth surface |
|---|---|---|
| K= | −1.60765E+01 | 1.10003E+01 |
| A= | 1.21000E−02 | −3.94840E−02 |
| B= | −2.87667E−03 | 9.99547E−03 |
| C= | 3.81469E−04 | −1.82532E−03 |
| D= | 5.06862E−05 | 1.63624E−04 |
| E= | −1.88244E−05 | −3.13987E−06 |
| F= | 8.17542E−07 | 2.40853E−07 |
| G= | 9.74700E−09 | −1.46069E−07 |

FIG. 13

(embodiment no.4)
aspherical coefficient

| first surface | second surface | third surface | fourth surface |
|---|---|---|---|
| K= 3.08646E-01 | K= -1.05670E+05 | K= -2.84107E+00 | K= -1.31295E+00 |
| A= -2.22599E-02 | A= -3.13068E-02 | A= -1.63616E-01 | A= 1.37486E-03 |
| B= 2.01846E-02 | B= -8.50226E-02 | B= 3.66953E-02 | B= 1.49892E-01 |
| C= -1.53939E-01 | C= 7.85661E-02 | C= 1.31735E-01 | C= -8.32054E-02 |
| D= 2.36586E-01 | D= -1.75305E-01 | D= -6.97782E-02 | D= 2.39171E-02 |
| E= -1.99005E-01 | E= 6.08364E-02 | E= -3.78948E-01 | E= -9.62204E-04 |
|  |  |  | F= -2.36108E-03 |

| fifth surface | sixth surface |
|---|---|
| K= -1.23114E+01 | K= -9.89631E-01 |
| A= 1.01416E-02 | A= -3.90111E-02 |
| B= -4.62509E-03 | B= 1.24893E-02 |
| C= 7.37331E-04 | C= -4.34164E-03 |
| D= 1.97137E-04 | D= 7.83835E-04 |
| E= -8.13100E-05 | E= -6.24791E-05 |
| F= 1.17709E-05 | F= 4.68442E-06 |
| G= -1.03807E-06 | G= -6.07596E-07 |

(embodiment no.5)
aspherical coefficient

| first surface | second surface | third surface | fourth surface |
|---|---|---|---|
| K= 2.45608E-01 | K= -9.05570E+03 | K= -2.22380E+00 | K= -9.88061E-01 |
| A= -1.68827E-02 | A= -2.20943E-02 | A= -9.37277E-02 | A= -3.37620E-03 |
| B= 1.02444E-02 | B= -4.01780E-02 | B= 4.99275E-02 | B= 8.13000E-02 |
| C= -5.58318E-02 | C= 3.59508E-02 | C= 4.44826E-02 | C= -2.71364E-02 |
| D= 6.58455E-02 | D= -4.11543E-02 | D= -2.06443E-02 | D= 8.80718E-03 |
| E= -4.01116E-02 | E= 1.66864E-02 | E= -6.47005E-02 | E= -7.62901E-04 |
| F= 2.89742E-03 | F= -5.80102E-03 | F= 7.50167E-02 |  |

| fifth surface | sixth surface |
|---|---|
| K= -1.18249E+01 | K= -1.57046E+01 |
| A= 5.43674E-03 | A= -2.38981E-02 |
| B= -1.14640E-03 | B= 6.98215E-03 |
| C= 1.11516E-04 | C= -1.60904E-03 |
| D= 3.50277E-05 | D= 2.07493E-04 |
| E= -1.50747E-05 | E= -1.42266E-05 |
| F= 2.44957E-06 | F= 6.64619E-07 |
| G= -1.70129E-07 | G= -3.96926E-08 |

(embodiment no.6)
aspherical coefficient

| third surface | fourth surface | fifth surface | sixth surface |
|---|---|---|---|
| K= -8.64244E-01 | K= 1.23342E+00 | K= -6.79233E+00 | K= -2.15604E+00 |
| A= -8.19775E-03 | A= -3.24900E-02 | A= -9.10223E-03 | A= -2.27868E-02 |
| B= 2.60486E-02 | B= 4.09561E-02 | B= 1.51055E-03 | B= 3.46272E-03 |
| C= 8.98540E-05 | C= -1.02041E-02 | C= -1.21137E-04 | C= -4.39648E-04 |
| D= -4.10128E-03 | D= 1.64736E-03 | D= 2.26977E-06 | D= 3.73822E-05 |
| E= -1.37588E-03 | E= -6.99940E-05 | E= -8.82661E-08 | E= -1.96506E-06 |
|  | F= -5.54852E-05 | F= 3.04085E-08 | F= 3.60255E-08 |
|  |  | G= -8.76888E-10 | G= 6.90407E-10 |

FIG. 14

(embodiment no.7)
  aspherical coefficient

| first surface | second surface | third surface | fourth surface |
|---|---|---|---|
| K= 3.47525E-01 | K= -9.05570E+03 | K= -1.99216E+00 | K= -1.41044E+00 |
| A= -7.17251E-03 | A= -2.41332E-02 | A= -7.80826E-02 | A= 9.66820E-03 |
| B= -2.51111E-02 | B= -3.55678E-02 | B= 3.65111E-02 | B= 4.34771E-02 |
| C= 7.51926E-03 | C= 2.08387E-02 | C= 2.20831E-02 | C= -1.20336E-02 |
| D= 4.36671E-02 | D= -1.33534E-02 | D= -9.17286E-03 | D= 3.75385E-03 |
| E= -7.92095E-02 | E= -1.87661E-03 | E= -2.11675E-02 | E= -5.35616E-05 |
| F= 3.46195E-02 | | F= 1.87210E-02 | F= -2.58926E-04 |

| fifth surface | sixth surface |
|---|---|
| K= -1.70412E+01 | K= -8.14868E-01 |
| A= -1.09807E-04 | A= -2.17200E-02 |
| B= -1.19343E-03 | B= 4.28327E-03 |
| C= 1.20310E-05 | C= -8.95016E-04 |
| D= 2.54208E-05 | D= 8.86404E-05 |
| E= -3.91527E-06 | E= -4.86675E-06 |
| F= 4.37868E-07 | F= 2.17650E-07 |
| G= -3.37988E-08 | G= -1.60862E-08 |

(embodiment no.8)
  aspherical coefficient

| first surface | second surface | third surface | fourth surface |
|---|---|---|---|
| K= 6.31377E-01 | K= 0.00000E+00 | K= -6.16754E-01 | K= -2.95454E-01 |
| A= -2.00576E-02 | A= 6.17554E-02 | A= 2.13742E-01 | A= -8.51578E-02 |
| B= -2.01876E-02 | B= 4.27015E-02 | B= 1.71140E+00 | B= 1.18428E+00 |
| | | C= -7.26144E+00 | C= -1.82272E+00 |
| | | D= 1.29532E+01 | D= 1.36752E+00 |
| | | E= -9.36359E+00 | E= -4.13843E-01 |

| fifth surface | sixth surface |
|---|---|
| K= -2.89864E+01 | K= -1.04596E+00 |
| A= 1.07475E-01 | A= -1.79627E-01 |
| B= -1.20796E-01 | B= 9.51161E-02 |
| C= 5.66824E-02 | C= -4.96535E-02 |
| D= -1.33252E-02 | D= 1.42568E-02 |
| | E= -2.04004E-03 |

(embodiment no.9)
  aspherical coefficient

| first surface | third surface | fourth surface | fifth surface |
|---|---|---|---|
| K= 1.36683E-01 | K= -9.34761E-01 | K= 6.37218E-01 | K= -1.47658E+01 |
| A= -6.71200E-03 | A= 4.78842E-01 | A= -3.11578E-02 | A= 6.50849E-02 |
| B= -4.21539E-03 | B= -9.33981E-02 | B= 9.41869E-01 | B= -7.67227E-02 |
| | C= -4.82673E-01 | C= -9.24660E-01 | C= 5.58136E-02 |
| | D= 4.15389E-01 | D= 3.94349E-01 | D= -2.15208E-02 |
| | | | E= 3.15E-03 |

| sixth surface |
|---|
| K= -5.72220E+00 |
| A= -1.54410E-01 |
| B= 9.08266E-02 |
| C= -4.61961E-02 |
| D= 1.31438E-02 |
| E= -1.64104E-03 |

FIG. 15

(embodiment no.10)
    aspherical coefficient

| first surface | second surface | third surface | fourth surface |
|---|---|---|---|
| K= 1.62003E−01 | K= −1.05670E+05 | K= −3.08561E+00 | K= −1.43182E−01 |
| A= −1.07880E−02 | A= −1.55828E−02 | A= −8.22898E−02 | A= 2.04562E−02 |
| B= 5.28888E−03 | B= −3.93855E−02 | B= 6.28552E−03 | B= 5.56215E−02 |
| C= −2.99750E−02 | C= 1.50227E−02 | C= 2.95885E−02 | C= −1.46717E−02 |
| D= 2.29583E−02 | D= −1.87614E−02 | D= 1.78527E−04 | D= 1.96679E−03 |
| E= −1.49313E−02 | E= −6.40561E−03 | E= −6.45527E−02 | E= −8.34252E−05 |
| F= 5.24481E−04 | | F= 2.29273E−02 | F= −5.92306E−04 |
| | | | G= 1.80904E−04 |

| fifth surface | sixth surface |
|---|---|
| K= −1.22413E+01 | K= −6.36504E+00 |
| A= −3.31550E−03 | A= −2.38375E−02 |
| B= 6.54548E−04 | B= 4.20787E−03 |
| C= 1.73075E−04 | C= −7.41503E−04 |
| D= −5.52731E−05 | D= 8.31932E−05 |
| E= 3.90429E−06 | E= −4.98867E−06 |
| F= 9.85324E−08 | F= 1.55165E−07 |
| G= −2.21587E−08 | G= −8.09331E−09 |

(embodiment no.11)
    aspherical coefficient

| first surface | second surface | third surface | fourth surface |
|---|---|---|---|
| K= 6.48363E−01 | K= −4.25740E+03 | K= −1.07814E+00 | K= −1.40048E+00 |
| A= −9.33949E−02 | A= −1.14725E−01 | A= 2.15861E−01 | A= 7.95380E−02 |
| B= 1.36520E−01 | B= −4.86493E−01 | B= −1.56527E−01 | B= 9.72918E−01 |
| C= −2.14652E+00 | C= 1.29680E+00 | C= −5.00900E−01 | C= −9.60906E−01 |
| D= 6.97513E+00 | D= −5.58987E+00 | D= −6.80493E−01 | D= 3.20639E−01 |
| E= −1.09507E+01 | E= 1.64311E+00 | E= −7.45384E+00 | E= −6.44615E−02 |
| | | F= −9.30560E+00 | F= −1.56092E−01 |
| | | G= −1.82237E+01 | G= 1.76404E−01 |

| fifth surface | sixth surface |
|---|---|
| K= −2.07630E+01 | K= 5.30960E+00 |
| A= 4.03457E−02 | A= −1.90814E−01 |
| B= −3.05919E−02 | B= 1.11175E−01 |
| C= 1.34980E−02 | C= −5.46177E−02 |
| D= 3.66841E−03 | D= 1.39893E−02 |
| E= −4.38373E−03 | E= −4.36860E−04 |
| F= 7.25000E−05 | F= 1.04228E−04 |
| G= −1.11307E−04 | G= −3.89603E−04 |

FIG. 16

(embodiment no.12)
aspherical coefficient

| first surface | second surface | third surface | fourth surface |
|---|---|---|---|
| K= −2.77760E−01 | K= 0.00000E+00 | K= −2.77351E+00 | K= −1.38975E+00 |
| A= 2.51833E−03 | A= −4.78216E−02 | A= −2.56287E−01 | A= −5.41264E−02 |
| B= −1.05210E−01 | B= −1.45187E−01 | B= 7.22245E−02 | B= 5.71789E−02 |
| C= 2.92415E−01 | C= 7.88826E−01 | C= 1.14784E−01 | C= −8.77097E−03 |
| D= −4.32151E−01 | D= −2.48683E+00 | D= 2.29873E−02 | D= 2.80370E−02 |
| E= 1.38283E−01 | E= 3.87438E+00 | E= −1.39831E−01 | E= −9.04843E−03 |
| F= 2.24202E−01 | F= −2.99432E+00 | F= 4.12176E−02 | F= −4.72830E−03 |
| G= −1.77176E−01 | G= 9.04400E−01 | G= 8.14469E−03 | G= 1.85053E−03 |

| fifth surface | sixth surface |
|---|---|
| K= −1.43040E+01 | K= 5.68951E+00 |
| A= −5.71183E−03 | A= −2.41178E−02 |
| B= 2.35948E−03 | B= 3.50606E−03 |
| C= −1.21663E−03 | C= −9.21755E−04 |
| D= 3.82586E−04 | D= 1.00626E−04 |
| E= −5.04191E−05 | E= 4.79817E−06 |
| F= 2.63567E−07 | F= −1.40845E−06 |
| G= 2.52862E−07 | G= 9.68213E−09 |

FIG. 17

|  | f3 / f1 | f / d2 | R32 / R31 | f / \| f23 \| |
|---|---|---|---|---|
| embodiment no.1 | 1.296 | 8.103 | 2.103 | 0.035 |
| embodiment no.2 | 1.982 | 8.521 | 2.681 | 0.007 |
| embodiment no.3 | 1.608 | 8.388 | 3.725 | 0.039 |
| embodiment no.4 | 1.065 | 8.602 | 4.840 | 0.123 |
| embodiment no.5 | 1.467 | 9.574 | 2.141 | 0.010 |
| embodiment no.6 | 2.173 | 10.439 | 1.260 | 0.262 |
| embodiment no.7 | 1.246 | 10.218 | 6.823 | 0.093 |
| embodiment no.8 | 2.616 | 5.248 | 1.541 | 0.125 |
| embodiment no.9 | 1.686 | 5.818 | 1.665 | 0.022 |
| embodiment no.10 | 1.596 | 9.185 | 2.079 | 0.291 |
| embodiment no.11 | 2.220 | 7.497 | 2.741 | 0.202 |
| embodiment no.12 | 0.997 | 8.599 | 5.831 | 0.199 |

TABLE 1

|  | total length |
|---|---|
| embodiment no.1 | 1.296 |
| embodiment no.2 | 1.982 |
| embodiment no.3 | 1.608 |
| embodiment no.4 | 1.065 |
| embodiment no.5 | 1.467 |
| embodiment no.6 | 2.173 |
| embodiment no.7 | 1.246 |
| embodiment no.8 | 2.616 |
| embodiment no.9 | 1.686 |
| embodiment no.10 | 1.596 |
| embodiment no.11 | 2.220 |
| embodiment no.12 | 0.997 |

TABLE 2

LENS ASSEMBLY FOR AN IMAGE SENSOR

BACKGROUND OF THE INVENTION

1. Field of the Invention

The present invention relates to a lens assembly for an image sensor, which is comprised of an aperture, a first lens, a second lens and a third lens, each lens of this assembly has an improved capability of restraining the power, so that the sensitivity of decentration and the aberration-correcting effect of the whole lens assembly in accordance with the present invention can be effectively improved.

2. Description of the Prior Arts

Image sensor has been widely used in different areas nowadays. For example, the mobile phone also has been equipped with such an image sensor comprised of a solid state imaging device and lens, such as Charge Coupled Device (CCD) sensor or Complementary Metal Oxide Semi-conductor (CMOS) sensor. With the development of science and technology, the mobile phone is becoming more and more smaller, thereby, the lens in the mobile phone also needs to be miniaturized.

For example, JP Patent 2004-4566 discloses an image lens assembly consisted of three miniaturized lenses which are arranged sequentially from the object side: 1, an aperture; 2, a first biconvex lens having a positive refracting power; 3, a second lens having a negative refracting power whose concave surface is located on the object side; 4, a third meniscus lens whose convex surface faces the object side.

However, this lens assembly has some disadvantages. For example, the power of the first lens is excessively strong. Meanwhile, aberration-correction should be carried out in order to modify the power of the first lens, consequently, the power of the second lens also should be strong. However, if all the respective lenses are strong in power, the sensitivity of decentration of the whole image lens assembly will be excessively increased, so that the function and effect of the lens assembly is consequently affected in a detrimental way.

The present invention has arisen to mitigate and/or obviate the afore-described disadvantages.

SUMMARY OF THE INVENTION

The primary objective of the present invention is to provide a lens assembly for an image sensor capable of reducing the sensitivity of decentration comprises an aperture, a first lens, a second lens and a third lens which are arranged sequentially from the object side. The first lens is a planoconvex lens or a positive meniscus lens whose convex surface faces the object side; the second lens is a negative meniscus lens with a convex surface facing the image side and, at least, has an aspherical surface; and the third lens is a positive meniscus lens with a convex surface facing the object side and, at least, has an aspherical surface. Each lens of this arrangement has an improved capability of restraining the power, so that the sensitivity of decentration and the aberration-correction effect of the whole lens assembly in accordance with the present invention can be effectively improved.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 13 shows the aspherical coefficients of the lens assembly in accordance with the first, second and third embodiments of the present invention;

FIG. 14 shows the aspherical coefficients of the lens assembly in accordance with the fourth, fifth and sixth embodiments of the present invention;

FIG. 15 shows the aspherical coefficients of the lens assembly in accordance with the seventh, eighth and ninth embodiments of the present invention;

FIG. 16 shows the aspherical coefficients of the lens assembly in accordance with the tenth and the eventh embodiments of the present invention;

FIG. 17 shows the aspherical coefficients of the lens assembly in accordance with the twelfth embodiment of the present invention;

Tables 1 and 2 show the real numerical values of the respective embodiments.

DETAILED DESCRIPTION OF THE PREFERRED EMBODIMENTS

With reference to the respective figures, a lens assembly for an image sensor comprises an aperture 1, a first lens L1, a second lens L2, a third lens L3, a parallel flat glass 2 and an image plane 3 (the aperture 1 and the image plane 3 are indicated by the lines), which are arranged sequentially from the object side.

The aperture 1 is disposed nearest to the object side.

Figure 7A:
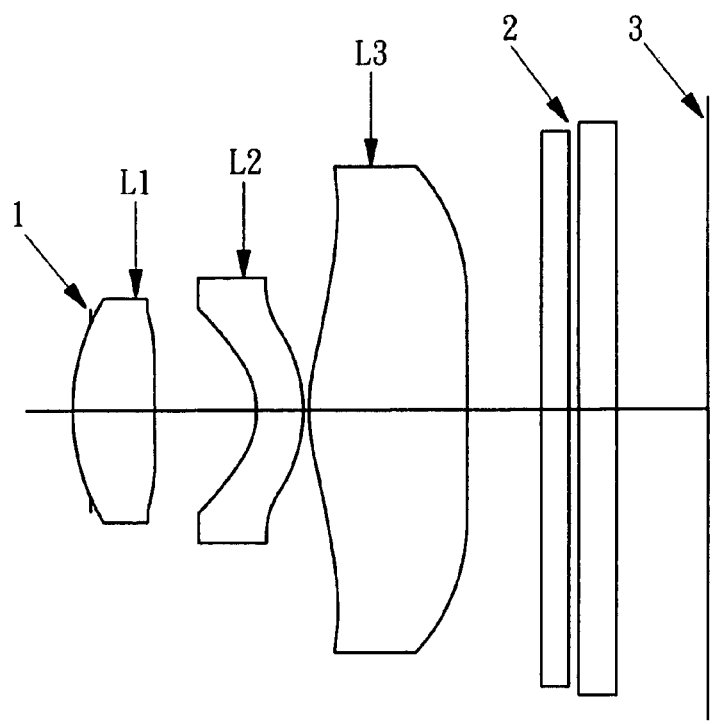
FIG. 7A is a lens assembly for an image sensor in accordance with a seventh embodiment of the present invention.
Figure 7B:
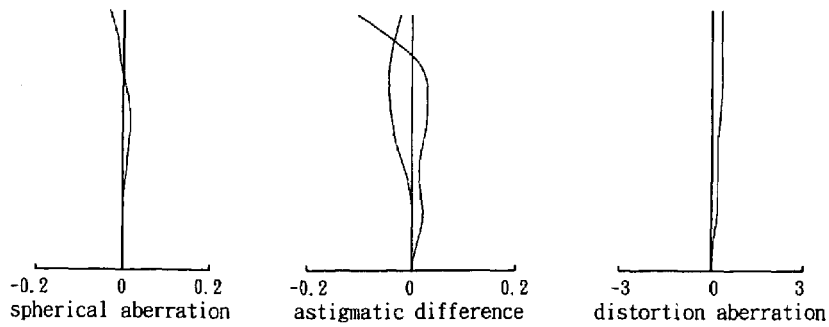
FIG. 7B shows the optical characteristic data and the aberration-correction of the lens assembly in accordance with the seventh embodiment of the present invention.
Figure 8A:
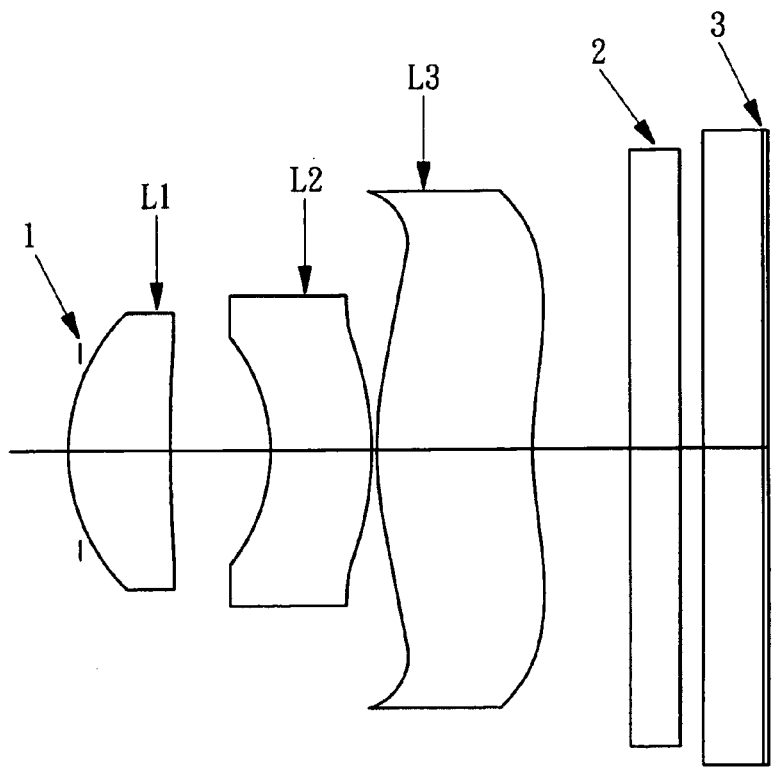
FIG. 8A is a lens assembly for an image sensor in accordance with a eighth embodiment of the present invention.
Figure 8B:
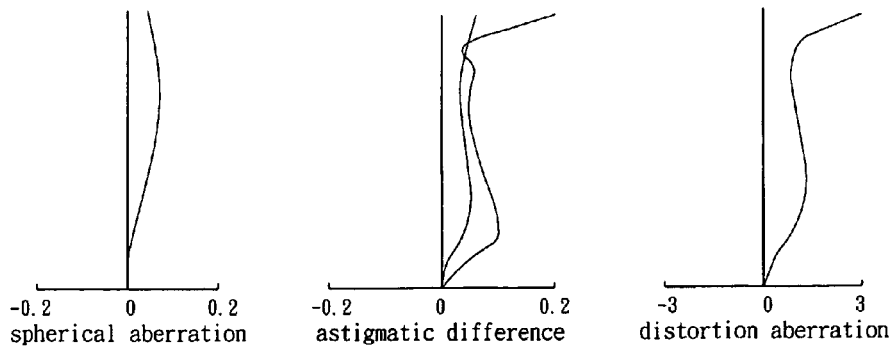
FIG. 8B shows the optical characteristic data and the aberration-correction of the lens assembly in accordance with the eighth embodiment of the present invention.
Figure 9A:
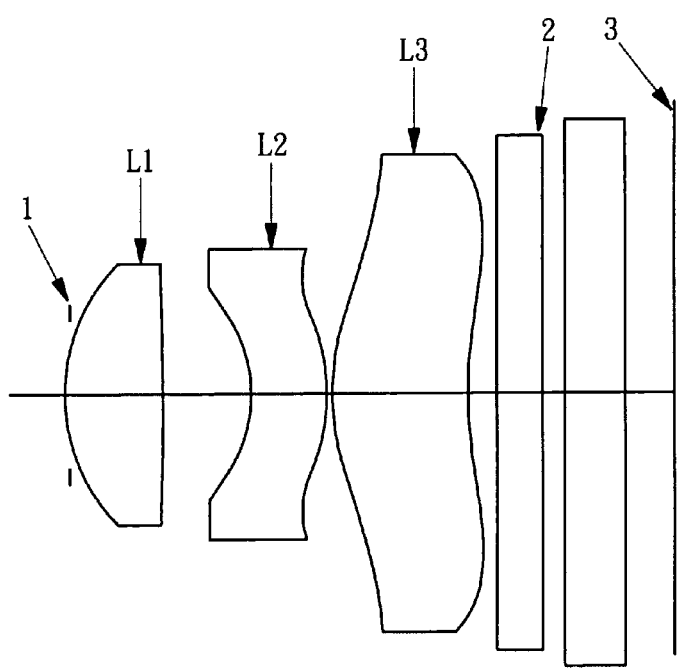
FIG. 9A is a lens assembly for an image sensor in accordance with a ninth embodiment of the present invention.
Figure 9B:
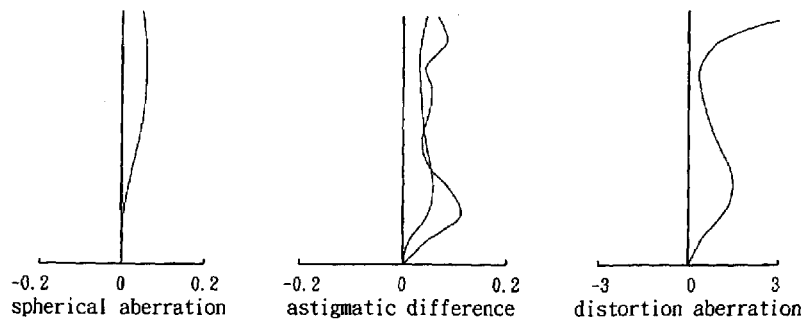
FIG. 9B shows the optical characteristic data and the aberration-correction of the lens assembly in accordance with the ninth embodiment of the present invention.
Figure 10A:
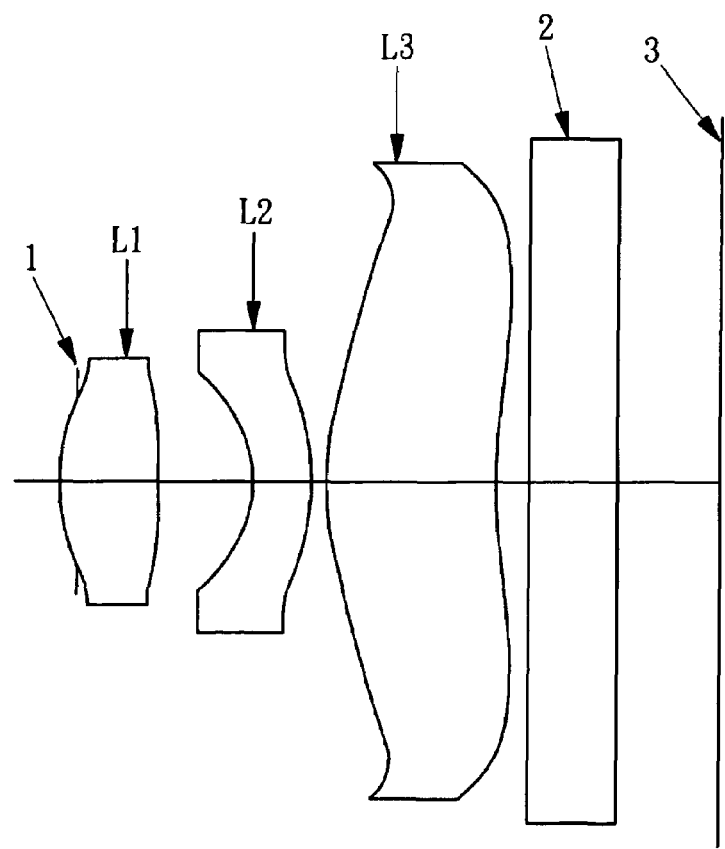
FIG. 10A is a lens assembly for an image sensor in accordance with a tenth embodiment of the present invention.
Figure 10B:
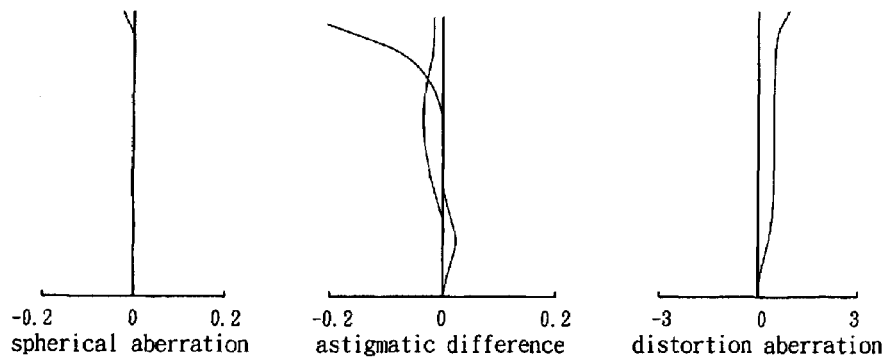
FIG. 10B shows the optical characteristic data and the aberration-correction of the lens assembly in accordance with the tenth embodiment of the present invention.
Figure 11A:
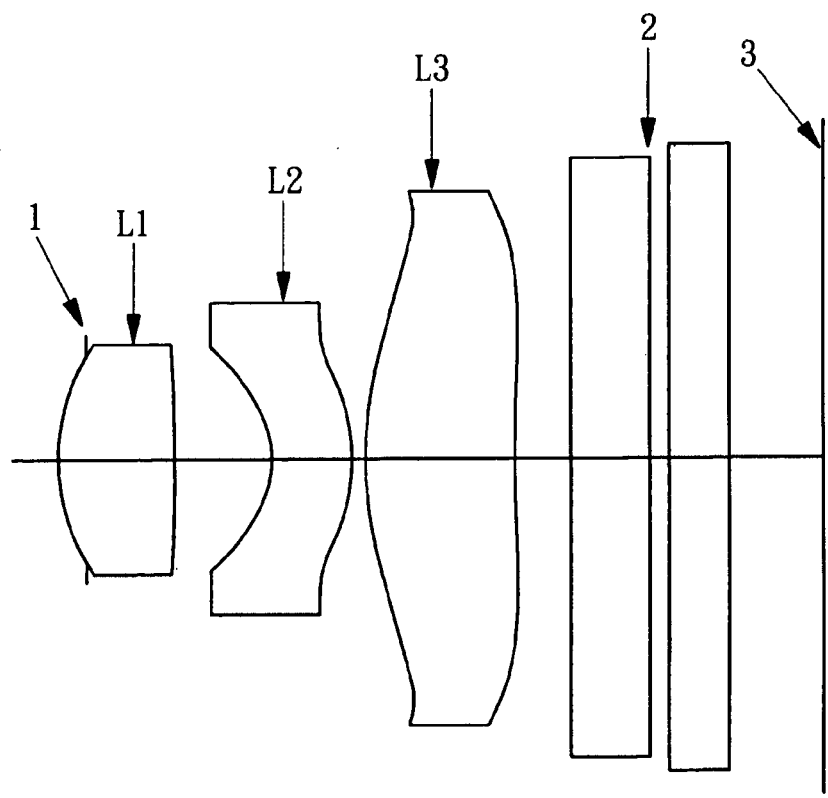
FIG. 11A is a lens assembly for an image sensor in accordance with a eleventh embodiment of the present invention.
Figure 11B:
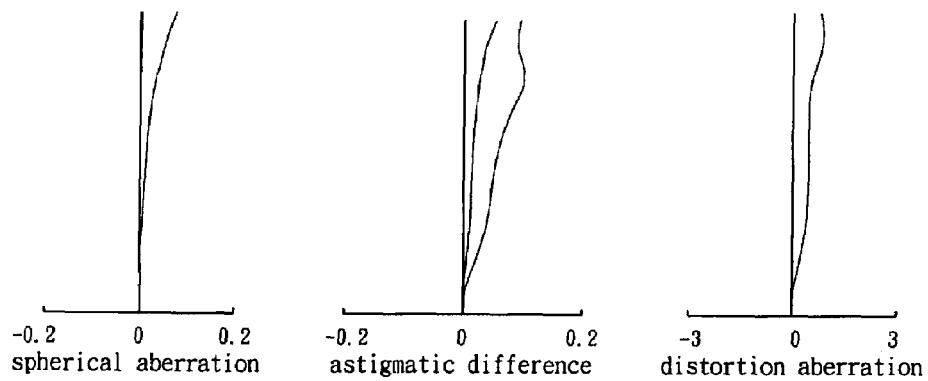
FIG. 11B shows the optical characteristic data and the aberration-correction of the lens assembly in accordance with the eleventh embodiment of the present invention.
Figure 12A:
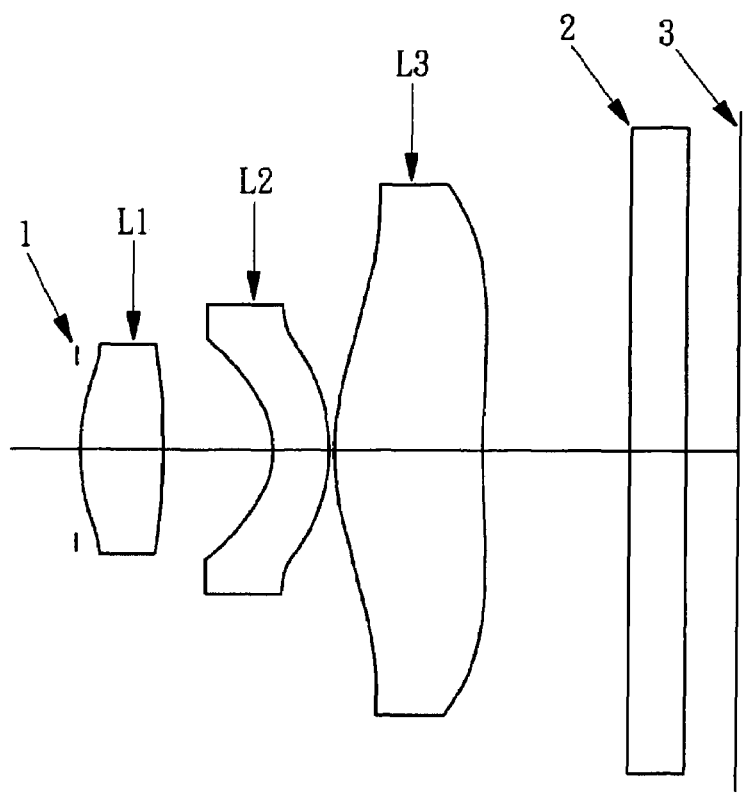
FIG. 12A is a lens assembly for an image sensor in accordance with a twelfth embodiment of the present invention.
Figure 12B:
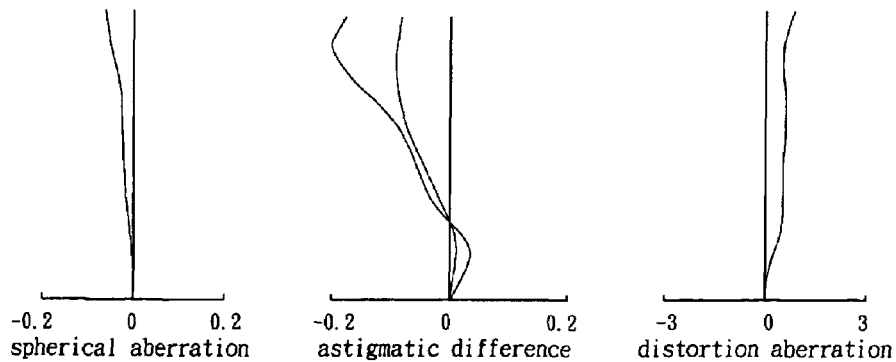
FIG. 12B shows the optical characteristic data and the aberration-correction of the lens assembly in accordance with the twelfth embodiment of the present invention.

The first lens L1 can be a planoconvex lens or a positive meniscus lens whose convex surface faces the object side. The first lens L1 as shown in FIGS. 7–12 is a planoconvex lens L1, and the first lens L1 shown in the rest figures is a meniscus lens. The first lens L1 according to the present invention is more capable of restraining the increased power than the conventional invention.

Figure 1A:
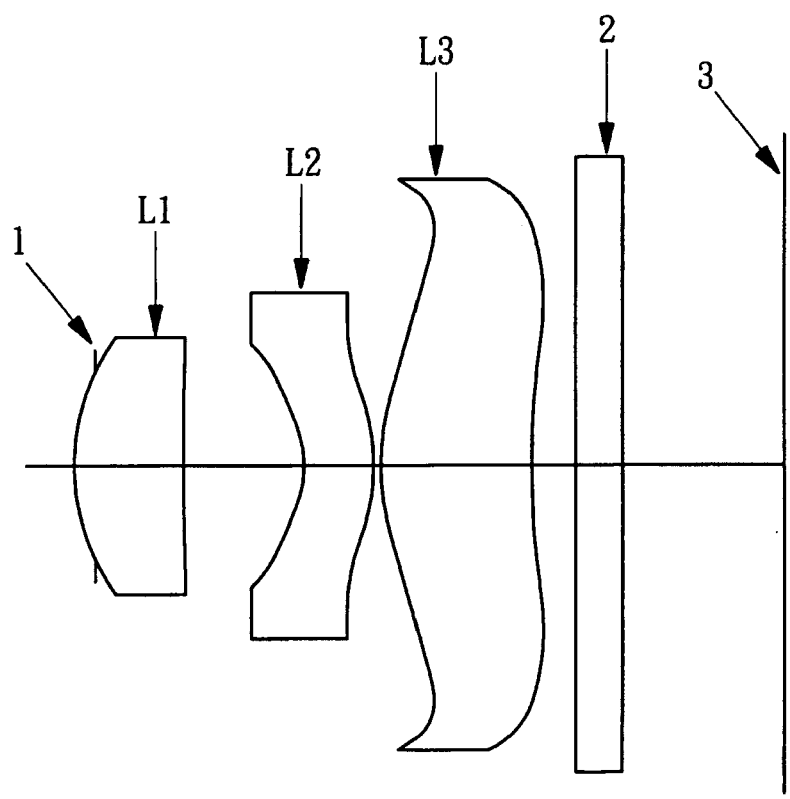
FIG. 1A is a lens assembly for an image sensor in accordance with a first embodiment of the present invention.
Figure 1B:
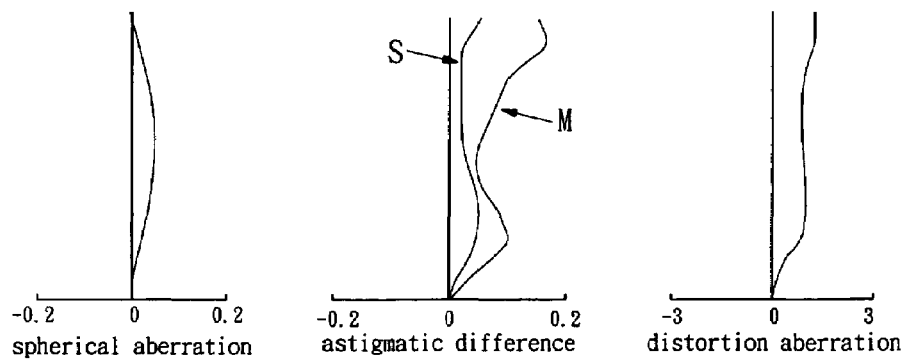
FIG. 1B shows the optical characteristic data and the aberration-correction of the lens assembly in accordance with the first embodiment of the present invention.
Figure 2A:
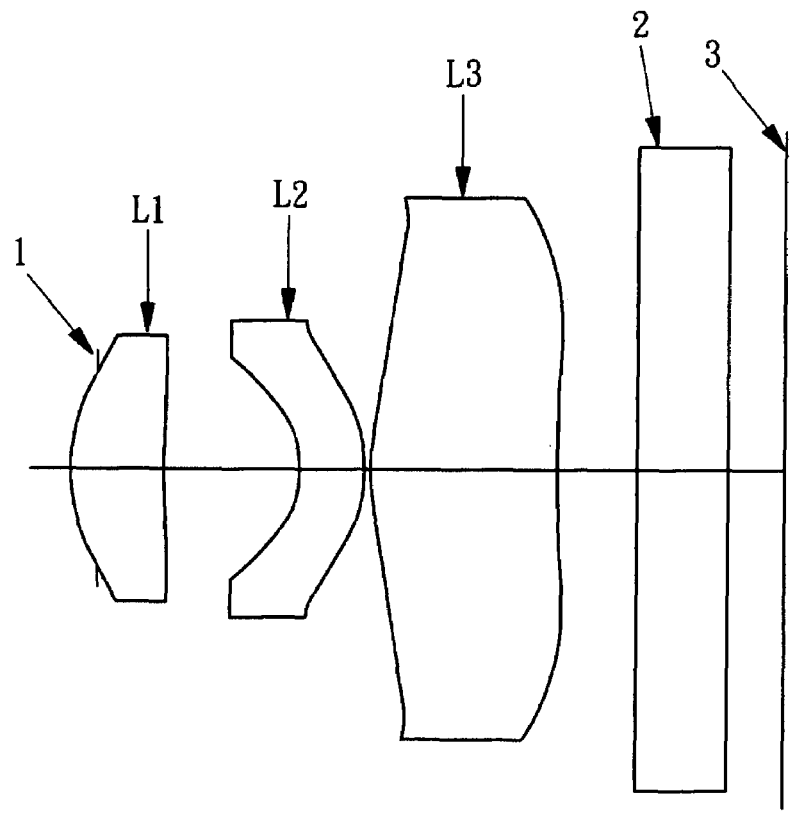
FIG. 2A is a lens assembly for an image sensor in accordance with a first embodiment of the present invention.
Figure 2B:
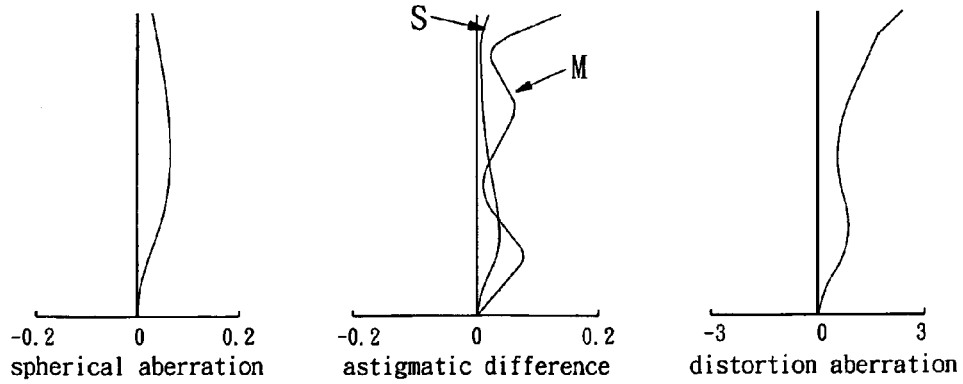
FIG. 2B shows the optical characteristic data and the aberration-correction of the lens assembly in accordance with the first embodiment of the present invention.
Figure 3A:
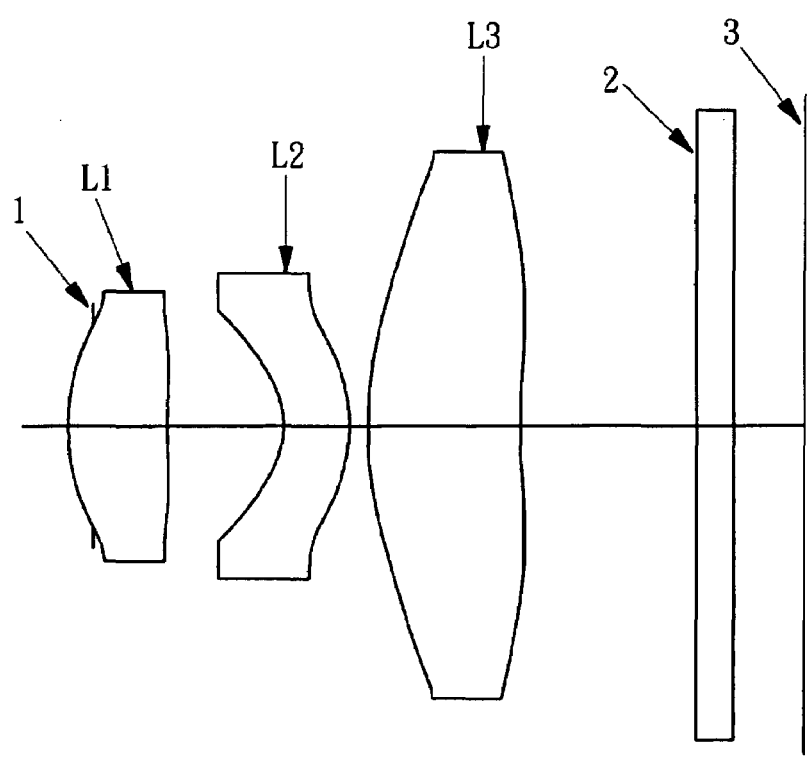
FIG. 3A is a lens assembly for an image sensor in accordance with a third embodiment of the present invention.
Figure 3B:
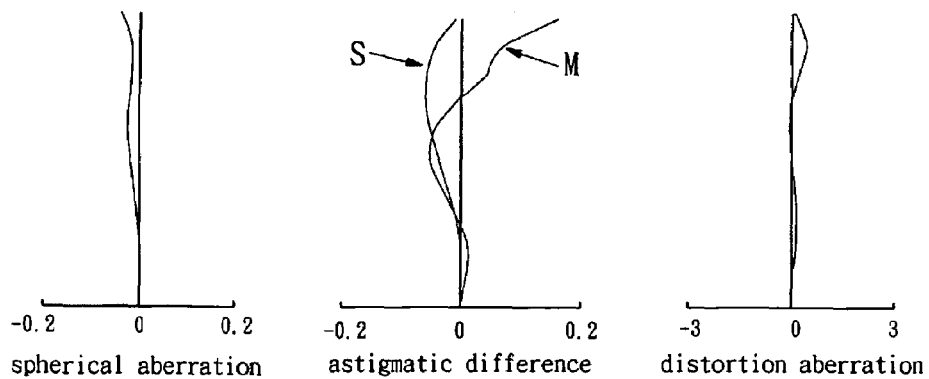
FIG. 3B shows the optical characteristic data and the aberration-correction of the lens assembly in accordance with the third embodiment of the present invention.
Figure 4A:
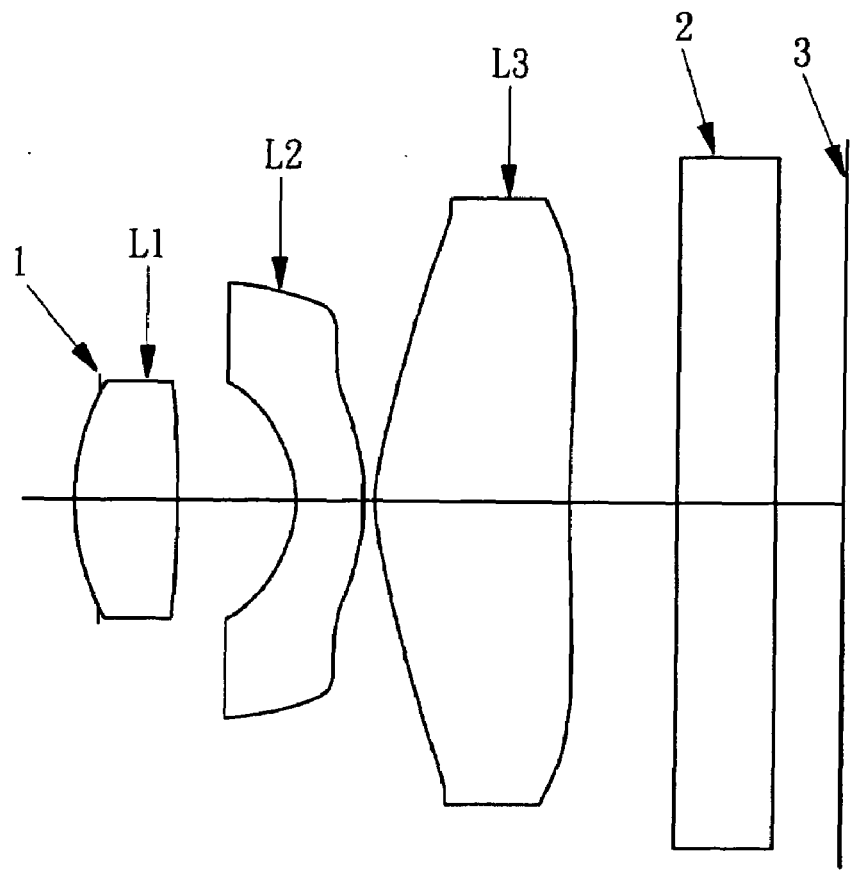
FIG. 4A is a lens assembly for an image sensor in accordance with a fourth embodiment of the present invention.
Figure 4B:
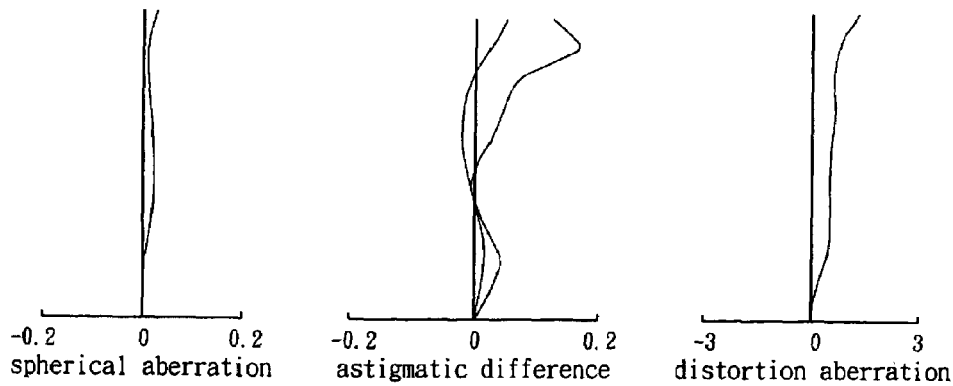
FIG. 4B shows the optical characteristic data and the aberration-correction of the lens assembly in accordance with the fourth embodiment of the present invention.
Figure 5A:
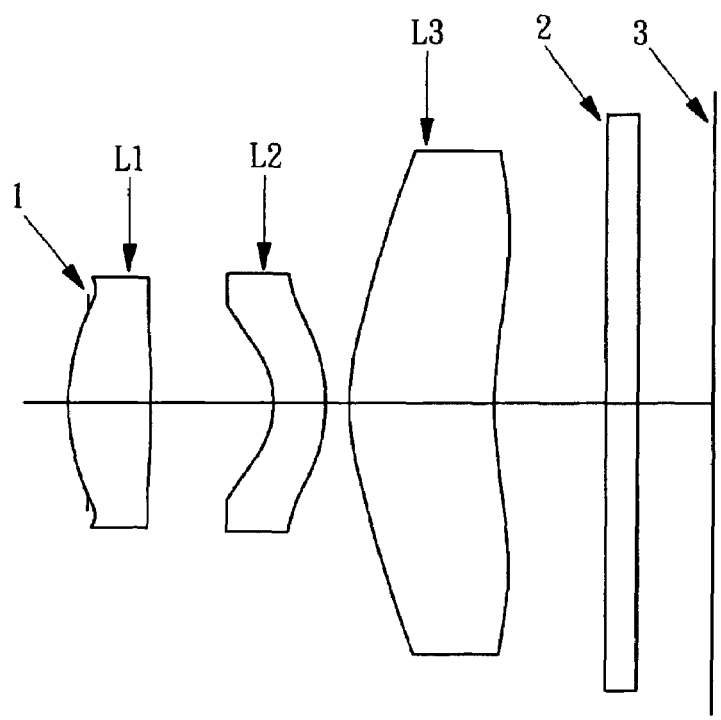
FIG. 5A is a lens assembly for an image sensor in accordance with a fifth embodiment of the present invention.
Figure 5B:
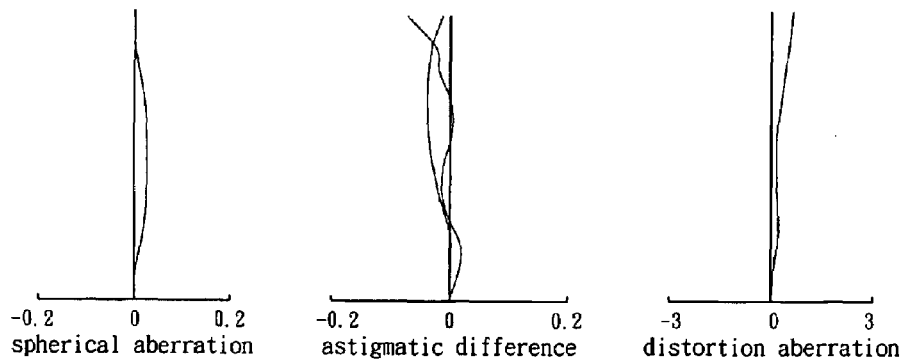
FIG. 5B shows the optical characteristic data and the aberration-correction of the lens assembly in accordance with the fifth embodiment of the present invention.
Figure 6A:
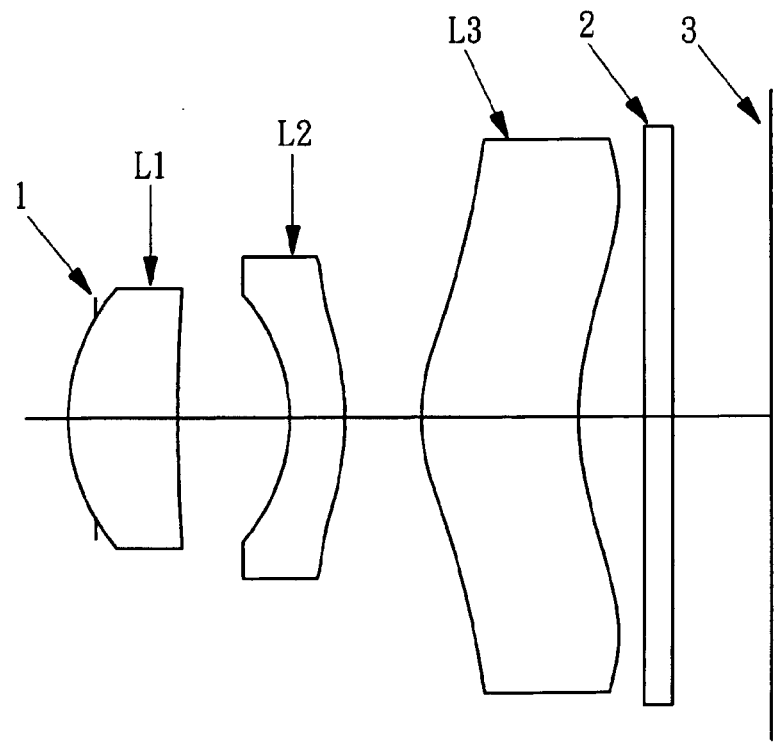
FIG. 6A is a lens assembly for an image sensor in accordance with a sixth embodiment of the present invention.
Figure 6B:
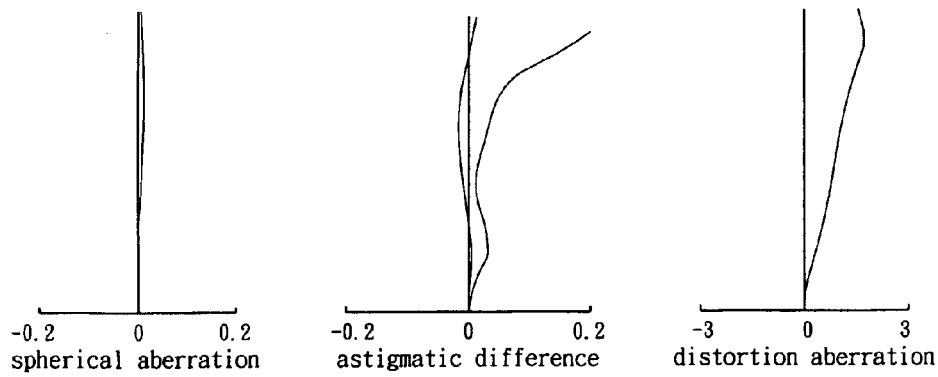
FIG. 6B shows the optical characteristic data and the aberration-correction of the lens assembly in accordance with the sixth embodiment of the present invention.

The second lens L2 is a negative meniscus lens with a convex surface facing the image side and at least has an aspherical surface. The second lens L2 as shown in FIGS. 1–12 has two aspherical surfaces.

The third lens L3 is a positive meniscus lens with a convex surface facing the object side and, at least, has an aspherical surface. The Third lens L3 as shown in FIGS. 1–12 has two aspherical surfaces.

The parallel flat glass 2 has the same function of an infrared (IR) cut filter or a cover glass in a CCD sensor. The lens assembly as shown in FIGS. 7, 8, 9 and 11 is provided with two pieces of parallel glass 2.

The image plane 3 is provided with CCD solid-state imaging device, and the package type of the CMOS sensor of the solid-state imaging device on the image plane 3 is CIB (chip on board). Since the CMOS sensor is protected by a thin resin film, no extra cover glass is required.

For a better understanding of the invention, its operating advantages and specific objects attained by its uses, reference should be made to the accompanying drawings and descriptive matter in which preferred embodiments of the invention are illustrated.

Firstly, the meaning of the letters and codes in the respective drawings are explained as follows:

f represents the focal length.

F represents the F-number.

W represents the angle of view.

The Arabic numbers 1, 2, 3 . . . . 10 represent the sequence number of the surfaces of the respective lenses from the object side. For example, the front surface and the rear surface of the first lens L1 are designated by 1 and 2, respectively.

R represents the paraxial radius of curvature (its unit is mm). For example, the Arabic numbers 7 and 8 represent two surfaces of the parallel flat glass 2, whichever of the surfaces 7, 8 has an infinite radius of curvature ∞.

d represents the thickness and its unit is mm.

nd represents the refractive indices of the first lens L1, the second lens L2, the third lens L3 and the parallel glass 2.

vd represents the reciprocal dispersion of the first lens L1, the second lens L2, the third lens L3 and the parallel glass 2.

Therefore, f1 means the focal length of the first lens L1, f3 means the focal length of the third lens L3, f represents the focal length of the whole system, and f23 represents the combined focal length of the second lens L2 and the third lens L3. d2 represents the thickness of the second lens L2. R31 represents the radius of curvature of the object-side surface of the third lens L3 and R32 represents the radius of curvature of the image-side surface of the third lens L3.

FIGS. 1B–12B show the spherical aberration, the astigmatic difference and the distortion aberration of the respective embodiments. The data of the d line is shown in each of the drawings, and the astigmatic difference includes the Sagittal (S) plane and the meridional (M) plane.

The functions of the lens assembly in accordance with the present invention are explained as follows:

The lens assembly in accordance with the invention consists of three independent special lenses and is used in a handy device (such as the built-in optical system in the camera phone). The optical system comprises a first lens L1, a second lens L2 and a third lens L3. The first lens L1 of the optical system disclosed in JP Patent 2004-4566 is a biconvex lens, while the first lens L1 in accordance with the present invention is a planoconvex lens or a positive meniscus lens whose convex surface faces the object side. Thus, the first lens L1 of the present invention is not only able to restrain the power of its own, but also able to restrain the power of the second lens L2.

Furthermore, both the second lens L2 and the third lens L3 of the present invention are provided at least an aspherical surface, so that the power of the second lens L2 and the third lens L3 can be controlled by their own aspherical surfaces.

The above-mentioned two functions not only can effectively reduce the sensitivity of decentration, but also can enhance the aberration-correcting effect.

With reference to the respective B drawings, the respective data show that the lens assembly of the present invention can truly correct the aberrations and differences.

The first lens L1, the second lens L2 and the third lens L3 are preferably made of plastic material, so that the aspherical surface can be easily produced.

If the focal length f1 of the first lens L1 and the focal length f3 of the third lens L3 satisfy the relation: $0.9 < f3/f1 < 2.7$, then the effect of the lens assembly will be better.

When $f3/f1 \leq 0.9$, the power of the first lens L1 and the third lens L3 will be distributed improperly, and the aberration-correcting effect will be adversely affected. When f3/f1≧2.7, the power of the first lens L1 will be increased, thus resulting in an overhigh sensitivity of decentration.

If the focal length f of the whole lens assembly and the thickness d2 of the second lens L2 can satisfy the relation: 5.0<f/d2<11.0, the effect of the lens assembly will be optimized.

If f/d2≦5.0, the imaging device is too large, the lens is too thick, thus exceeding the total length.

If f/d≧11.0, image device is too small and the lens is too thin, they are difficult to be produced.

If the radius of curvature R31 of the object-side surface of the third lens L3 and the radius of curvature R32 of the image-side surface of the third lens L3 can satisfy the relation: 1.0<R32/R31<7.0, the effect of the lens assembly will be optimized.

If R32/R31≦1.0, the sag of the third lens L3 will be increased and the Flange back (the distance to the image plane 3) will be shortened.

If R32/R31≧7.0, the error of the thickness of the central part and the peripheral part of the third L3 will be increased, and if the lenses are made of plastic, with the temperature changes, more excessive errors will be caused in production.

It is to be noted that if the combined focal length f23 of the second lens L2 and the third lens L3 and the focal length f of the whole lens assembly can satisfy the relation: f/|f23|≦0.4, the effect of the lens assembly will be better.

If f/|f23|≧0.4, and the second and the third lenses L2, L3 are made of plastic, the focus position will change sharply with the change of temperature.

The figures of the invention include the figures for showing the structure of the lens assembly (FIGS. 1A–12A) and the figures for showing the optical characteristic data and the aberration-correction (FIGS. 1B–12B). And FIGS. 13–17 relates to the data of the aspherical surface of the respective embodiments. The real numerical values of the respective embodiments should be referred to the attached tables 1 and 2. The data of the d (thickness), in the respective embodiments 1–12, represents the total optical length, the preferred built-in values of the mobile phone can be referred to the attached table 2.

In FIGS. 13–17, the capital letters A, B, C, D, E, F and G represent the aspherical coefficients. If the surface vertex are represented by the height H relative to the optical axis and the displacement X in the optical axis, then a formula will be satisfied: $X=(1/R)H^2/\{1+[1-(1+K)(H/R)^2]^{1/2}\}+A\ H^4+B\ H^6+C\ H^8+D\ H^{10}+E\ H^{12}+F\ H^{14}+G\ H^{16}$. The capital R in this formula represents the paraxial radius of curvature, K represents the conical coefficients, the aspherical coefficient E-03 represents $10^{-3}$.

The aforementioned data show that if the data of f1, f3, d2, R3, R32 and F23 satisfy the following conditions, the effect of the lens assembly of the present invention will be optimized.

$$0.9 < f3/f1 < 2.7 \quad (1).$$

because the relation of f3/f1≦0.9 will lead to an improper power of the lenses and poor effect of aberration-correction, while the relation of f3/f1≧2.7 will lead to an overgreat power of the lenses and oversensitive decentration.

$$5.0 < f/d2 < 11.0 \quad (2).$$

because the imaging device will be overlarge and the lens will be overthick, exceeding the total length, if f/d2≦5.0; while the image device will be oversmall and the lens will be overthin, thus, they are difficult to be produced.

1.0<R32/R31<7.0, the effect of the lens assembly will be better. (3)

If R32/R31≦1.0, the sag will be increased and the Flange back will be shortened.

If R32/R31≧7.0, the error of the thickness of the central part and the peripheral part will be increased, and if the lenses are made of plastic, with the temperature changes, more excessive errors will be caused in production.

f/|f23|<0.4, the effect of the lens assembly will be better. (4).

If f/|f23|≧0.4, and the lenses are made of plastic, the focus position will change sharply with the change of temperature.

While we have shown and described various embodiments in accordance with the present invention, it should be clear to those skilled in the art that further embodiments may be made without departing from the scope of the present invention.

TABLE 1

|  | f3/f1 | f/d2 | R32/R31 | f/|f23| |
| --- | --- | --- | --- | --- |
| embodiment no.1 | 1.296 | 8.103 | 2.103 | 0.035 |
| embodiment no.2 | 1.982 | 8.521 | 2.681 | 0.007 |
| embodiment no.3 | 1.608 | 8.388 | 3.725 | 0.039 |
| embodiment no.4 | 1.065 | 8.602 | 4.840 | 0.123 |
| embodiment no.5 | 1.467 | 9.574 | 2.141 | 0.010 |
| embodiment no.6 | 2.173 | 10.439 | 1.260 | 0.262 |
| embodiment no.7 | 1.246 | 10.218 | 6.823 | 0.093 |
| embodiment no.8 | 2.616 | 5.248 | 1.541 | 0.125 |
| embodiment no.9 | 1.686 | 5.818 | 1.665 | 0.022 |
| embodiment no.10 | 1.596 | 9.185 | 2.079 | 0.291 |
| embodiment no.11 | 2.220 | 7.497 | 2.741 | 0.202 |
| embodiment no.12 | 0.997 | 8.599 | 5.831 | 0.199 |

TABLE 2

|  | total length |
| --- | --- |
| embodiment no.1 | 1.296 |
| embodiment no.2 | 1.982 |
| embodiment no.3 | 1.608 |
| embodiment no.4 | 1.065 |
| embodiment no.5 | 1.467 |
| embodiment no.6 | 2.173 |
| embodiment no.7 | 1.246 |
| embodiment no.8 | 2.616 |
| embodiment no.9 | 1.686 |
| embodiment no.10 | 1.596 |
| embodiment no.11 | 2.220 |
| embodiment no.12 | 0.997 |

What is claimed is:

1. A lens assembly for an image sensor comprising an aperture, a first lens, a second lens and a third lens arranged sequentially from the object side;
    wherein the first lens is a positive meniscus lens whose convex surface faces the object side;
    the second lens is a negative meniscus lens with a convex surface facing the image side and, at least, has an aspherical surface;
    the third lens is a positive meniscus lens with a convex surface facing the object side and, at least, has an aspherical surface; and
    the focal length of the first lens is f1, the focal length of the third lens is f3, and the f1 and the f3 satisfy the relation: 0.9<f3/f1<2.7.

2. The lens assembly for an image sensor as claimed in claim 1, wherein the focal length of the whole lens assembly is f and the thickness of the second lens is d2, the f and the d2 satisfy the relation: 5.0<f/d2<11.0.

3. The lens assembly for an image sensor as claimed in claim 2, wherein the combined focal length of the second lens and the third lens is f23 and the focal length of the whole lens assembly is f, the f23 and the f satisfy the relation: f/|f23|<0.4.

4. The lens assembly for an image sensor as claimed in claim 2, wherein the radius of curvature of the object-side surface of the third lens is R31 and the radius of curvature of the image-side surface of the third lens is R32, the R31 and R32 satisfy the relation: 1.0<R32/R31<7.0.

5. The lens assembly for an image sensor as claimed in claim 4, wherein the combined focal length of the second lens and the third lens is f23 and the focal length of the whole lens assembly is f, the f23 and the f satisfy the relation: f/|f23|<0.4.

6. The lens assembly for an image sensor as claimed in claim 1, wherein the radius of curvature of the object-side surface of the third lens is R31 and the radius of curvature of the image-side surface of the third lens is R32, the R31 and R32 satisfy the relation: 1.0<R32/R31<7.0.

7. The lens assembly for an image sensor as claimed in claim 6, wherein the combined focal length of the second lens and the third lens is f23 and the focal length of the whole lens assembly is f, the f23 and the f satisfy the relation: f/|f23|<0.4.

8. The lens assembly for an image sensor as claimed in claim 6, wherein the focal length of the whole lens assembly is f and the thickness of the second lens is d2, the f and the d2 satisfy the relation: 5.0<f/d2<11.0.

9. The lens assembly for an image sensor as claimed in claim 8, wherein the combined focal length of the second lens and the third lens is f23 and the focal length of the whole lens assembly is f, the f23 and the f satisfy the relation: f/|f23|<0.4.

10. The lens assembly for an image sensor as claimed in claim 1, wherein the combined focal length of the second lens and the third lens is f23 and the focal length of the whole lens assembly is f, the f23 and the f satisfy the relation: f/|f23|<0.4.

11. The lens assembly for an image sensor as claimed in claim 1, wherein the combined focal length of the second lens and the third lens is f23 and the focal length of the whole lens assembly is f, the f23 and the f satisfy the relation: f/|f23|<0.4.

12. The lens assembly for an image sensor as claimed in claim 1 comprises the aperture, the first lens, the second lens, the third lens, a parallel flat glass and an image plane, which are arranged sequentially from the object side.

13. The lens assembly for an image sensor as claimed in claim 12, wherein the parallel flat glass has the same function of an infrared cut filter.

14. The lens assembly for an image sensor as claimed in claim 12, wherein the parallel flat glass has the same function of a cover glass in a CCD sensor.

15. The lens assembly for an image sensor as claimed in claim 12 comprises two pieces of parallel flat glass which have the same function of an infrared cut filter in a CCD sensor.

16. The lens assembly for an image sensor as claimed in claim 12 comprises two pieces of parallel flat glass which have the same function of a cover glass in a CCD sensor.

17. The lens assembly for an image sensor as claimed in claim 12, wherein the image plane is provided with solid-state imaging device.

18. The lens assembly for an image sensor as claimed in claim 17, wherein the package type of the CMOS sensor of the solid-state imaging device on the image plane is chip on board, and the CMOS sensor is protected by a thin resin film.

19. The lens assembly for an image sensor as claimed in claim 1, wherein the radius of curvature of the object-side surface of the third lens is R31 and the radius of curvature of the image-side surface of the third lens is R32, the R31 and R32 satisfy the relation: 1.0<R32/R31<7.0.

20. The lens assembly for an image sensor as claimed in claim 19, wherein the combined focal length of the second lens and the third lens is f23 and the focal length of the whole lens assembly is f, the f23 and the f satisfy the relation: f/|f23|<0.4.

21. The lens assembly for an image sensor as claimed in claim 1, wherein the focal length of the whole lens assembly is f and the thickness of the second lens is d2, the f and the d2 satisfy the relation: 5.0<f/d2<11.0.

22. The lens assembly for an image sensor as claimed in claim 21, wherein the combined focal length of the second lens and the third lens is f23 and the focal length of the whole lens assembly is f, the f23 and the f satisfy the relation: f/|f23|<0.4.

23. The lens assembly for an image sensor as claimed in claim 1, wherein the focal length of the first lens is f1, the focal length of the third lens is f3, and the f1 and the f3 satisfy the relation: 0.9<f3/f1<2.7, the focal length of the whole lens assembly is f and the thickness of the second lens is d2, the f and the d2 satisfy the relation: 5.0<f/d2<11.0, the radius of curvature of the object-side surface of the third lens is R31 and the radius of curvature of the image-side surface of the third lens is R32, the R31 and R32 satisfy the relation: 1.0<R32/R31<7.0, and the combined focal length of the second lens and the third lens is f23 and the focal length of the whole lens assembly is f, the f23 and the f satisfy the relation: f/|f23|<0.4.

24. The lens assembly for an image sensor as claimed in claim 1, wherein, the second lens and the third lens are made of plastic material, so that the aspherical surface can be easily produced.

* * * * *